(12) United States Patent
Kim et al.

(10) Patent No.: US 8,739,162 B2
(45) Date of Patent: May 27, 2014

(54) ACCURATE MEASUREMENT OF MULTITHREADED PROCESSOR CORE UTILIZATION AND LOGICAL PROCESSOR UTILIZATION

(75) Inventors: Hyun Kim, Sunnyvale, CA (US); Scott J. Norton, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1820 days.

(21) Appl. No.: 11/796,423

(22) Filed: Apr. 27, 2007

(65) Prior Publication Data

US 2008/0271043 A1    Oct. 30, 2008

(51) Int. Cl.
*G06F 9/46*     (2006.01)
*G06F 9/50*     (2006.01)
*G06F 9/48*     (2006.01)
*G06F 11/34*    (2006.01)

(52) U.S. Cl.
CPC ............ *G06F 9/5027* (2013.01); *G06F 9/4843* (2013.01); *G06F 11/34* (2013.01); *G06F 11/3419* (2013.01); *G06F 11/3423* (2013.01)
USPC ............................ 718/100; 718/102; 718/108

(58) Field of Classification Search
CPC ..... G06F 9/5027; G06F 9/4843; G06F 11/34; G06F 11/3419; G06F 11/3423
See application file for complete search history.

(56) References Cited

U.S. PATENT DOCUMENTS

| | | | | |
|---|---|---|---|---|
| 5,564,031 A | * | 10/1996 | Amerson et al. | 711/209 |
| 6,735,769 B1 | * | 5/2004 | Brenner et al. | 718/105 |
| 6,865,526 B1 | * | 3/2005 | Henkel et al. | 703/18 |
| 6,996,822 B1 | * | 2/2006 | Willen et al. | 718/102 |
| 7,036,123 B2 | | 4/2006 | Dorofeev et al. | |
| 7,167,916 B2 | * | 1/2007 | Willen et al. | 709/226 |
| 7,707,578 B1 | * | 4/2010 | Zedlewski et al. | 718/102 |
| 7,743,383 B2 | * | 6/2010 | Norton et al. | 718/106 |
| 2002/0188734 A1 | | 12/2002 | Johnson | |
| 2003/0055864 A1 | * | 3/2003 | Armstrong et al. | 709/107 |
| 2003/0110203 A1 | * | 6/2003 | Brenner et al. | 709/103 |
| 2003/0187531 A1 | * | 10/2003 | Circenis et al. | 700/102 |
| 2003/0227932 A1 | | 12/2003 | Meempat et al. | |
| 2004/0003023 A1 | * | 1/2004 | Gootherts et al. | 709/107 |
| 2004/0054999 A1 | * | 3/2004 | Willen et al. | 718/103 |
| 2005/0172164 A1 | * | 8/2005 | Fox et al. | 714/13 |
| 2006/0048160 A1 | * | 3/2006 | Olszewski et al. | 718/105 |
| 2006/0095908 A1 | * | 5/2006 | Norton et al. | 718/100 |

(Continued)

OTHER PUBLICATIONS

"HP Virtual Environment: tips for Application Developers" Retrieved from the Internet: docs.hp.com/en/9450/vse_tips_for_application_developers.pdf. Total pp. 15, 2006.

(Continued)

*Primary Examiner* — Meng An
*Assistant Examiner* — Caroline H Arcos

(57) ABSTRACT

An embodiment of the invention provides an apparatus and method for accurate measurement of utilizations in a hardware multithreaded processor core. The apparatus and method perform the acts including: determining idle time spent cycles which are cycles that are spent in idle by a hardware thread in a processor core; determining idle consumed cycles which are cycles that are consumed in the idle time spent cycles, by the hardware thread; and determining at least one of a processor core utilization and a logical processor utilization based upon at least one of the idle time spent cycles (d1) and idle consumed cycles (d3).

15 Claims, 2 Drawing Sheets

(56) References Cited

U.S. PATENT DOCUMENTS

| | | |
|---|---|---|
| 2006/0123423 A1* | 6/2006 | Brenner .................. 718/105 |
| 2006/0206881 A1 | 9/2006 | Dodge et al. |
| 2007/0061788 A1 | 3/2007 | Dodge et al. |
| 2007/0061809 A1 | 3/2007 | Dodge et al. |
| 2007/0260895 A1* | 11/2007 | Aguilar et al. ............. 713/300 |
| 2007/0288728 A1* | 12/2007 | Tene et al. ................ 712/227 |
| 2007/0300227 A1* | 12/2007 | Mall et al. ................ 718/102 |
| 2008/0114973 A1* | 5/2008 | Norton et al. ............. 712/228 |

OTHER PUBLICATIONS

HP Partitioning Continuum for HP-UX1 1i on HP 9000 and Hp Integrity Servers. Retrieved from the internet: h71028.7.hp.com/ERC/downloads/5982-9141EN.pdf?jumpid=reg Total pp. 39, 2006.

\* cited by examiner

ACCURATE MEASUREMENT OF MULTITHREADED PROCESSOR CORE UTILIZATION AND LOGICAL PROCESSOR UTILIZATION

TECHNICAL FIELD

Embodiments of the invention relate generally to an accurate measurement of multithreaded processor core utilization and logical processor utilization.

BACKGROUND

A multi-core processor architecture is implemented by a single processor that plugs directly into a single processor socket, and that single processor will have one or more "processor cores". Those skilled in the art also refer to processor cores as "CPU cores". The operating system perceives each processor core as a discrete logical processor. A multi-core processor can perform more work within a given clock cycle because computational work is spread over to the multiple processor cores.

Hardware threads are the one or more computational objects that share the resources of a core but architecturally look like a core from an application program's viewpoint. As noted above, a core is the one or more computational engines in a processor. Hardware multithreading (also known as HyperThreading) is a technology that allows a processor core to act like two or more separate "logical processors" or "computational objects" to the operating system and the application programs that use the processor core. In other words, when performing the multithreading process, a processor core executes, for example, two threads (streams) of instructions sent by the operating system, and the processor core appears to be two separate logical processors to the operating system. The processor core can perform more work during each clock cycle by executing multiple hardware threads. Each hardware thread typically has its own thread state, registers, stack pointer, and program counter.

With a multithreaded processor core, the ability to accurately measure the processor core utilization and/versus the logical processor utilization is hampered or deficient. This problem applies whether the multithreaded processor architecture provides a shared Interval Timers Counter (ITC) or dedicated per hardware thread ITCs. The ITCs provide a time interval for counting the processor cycles (CPU execution time) that are consumed by a hardware thread. For example, in a multithreaded processor core with two sibling hardware threads, the measured utilization for the multithreaded core may be at 100% utilization, with one hardware thread utilizing 100% of the processor cycles (i.e., this hardware thread does not give up its processing cycles to the other hardware thread by issuing yield operations operation such as hint@pause and PAL_HALT_LIGHT) and the second hardware thread being idle. Since the second hardware thread is not fully utilized, the total core usage and throughput are not maximized. Additional complexity is also introduced when accounting for the hardware thread scheduling yield operations. For example, as discussed in commonly-owned U.S. patent application Ser. No. 11/796,511 (U.S. Patent Publication 2008/0271027), by Scott J. Norton and Hyun Kim, entitled "FAIR SHARE SCHEDULING WITH HARDWARE MULTITHREADING", which is hereby fully incorporated herein by reference, the secondary hardware thread will execute a yield operation if a task in a fair share group is not found for execution by the secondary hardware thread. The yield operations by the secondary hardware thread results in a decrease of logical processor utilization.

For capacity planning purpose and load distribution algorithms to work properly, it is important to accurately measure the processor core utilization and logical processor utilization (i.e., hardware thread utilization), in order to distinguish an idling logical processor. It is possible for the processor core be 100% utilized, but one or more logical processors may be idle, as discussed above. However, prior methods do not provide an accurate measurement of core utilization and/versus logical processor utilization in a multithreaded processor core.

Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
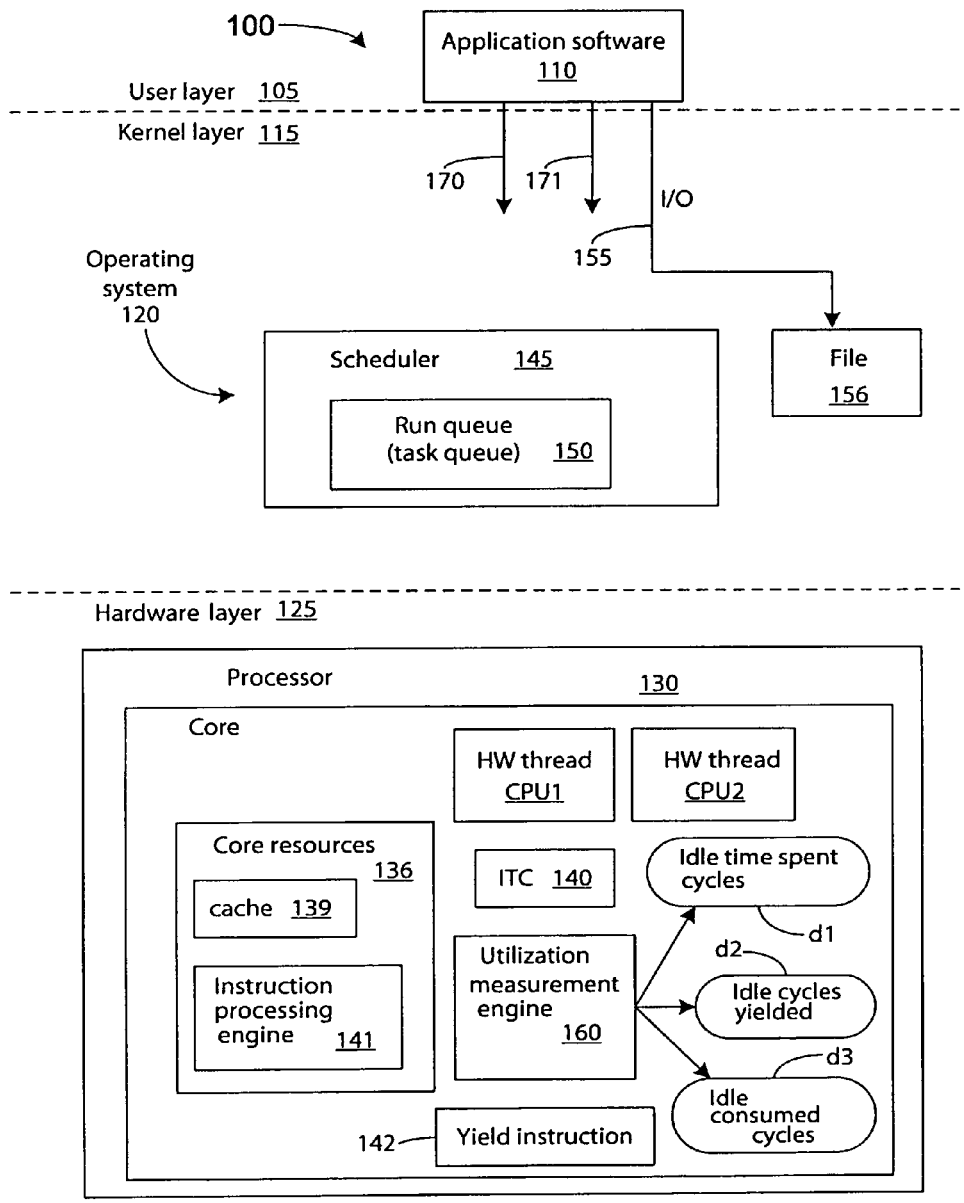
FIG. 1 is a block diagram of a system (apparatus) in accordance with an embodiment of the invention.

FIG. 1 is a block diagram of a system (apparatus) 100 in accordance with an embodiment of the invention. The system 100 is typically a computer system that is in a computing device. A user layer 105 will have an application software 110 that will run in the system 100. It is understood that more than one application software can run in the user layer 105. A kernel layer 115 includes an operating system 120 with various features as described below. A hardware layer 125 includes a processor 130. More than one processor can be in the hardware layer 125. The processor 130 includes a CPU core (i.e., processor core) 135. Alternatively, the processor 130 can be multi-core processor by having with multiple processor cores, although the cores in the processor 130 may vary in number. Since the core 135 includes the hardware threads (i.e., logical processors) CPU1 and CPU2, the core 135 is a multithreaded core. The number of hardware threads in a core 135 can vary. A core 135 also has resources 136 which include, for example, a cache 139, instruction processing engine 141, and other known core resources.

Hardware threads CPU1 and CPU2 will be used to discuss the following example operation, although in other embodiments, the below computations may also be applied to a core with more that two hardware threads. Threads CPU1 and CPU2 are sibling hardware threads because they are in the core 135. Typically, the operating system (OS) 120 is booted with hardware multithreading enabled in the hardware layer 125 for the cores. As the OS 120 boots, the OS 120 views each hardware thread CPU1 and CPU2 as multiple CPUs.

The application software 110 can, for example, have more than two software threads 170 and 171. As known to those skilled in the art, the number of software threads to be executed can vary. The hardware thread CPU1 may choose the software thread 170 from a run queue 150 in scheduler 145 and execute that software thread 170. Similarly, the hardware thread CPU2 may choose the software thread 171 from the run queue 150 (or another run queue in scheduler 145) and execute that software thread 171.

When computing the processor utilization in a multi-threaded processor, the execution units 141 are shared between multiple hardware threads in a core 135. In the examples below, two hardware threads CPU1 and CPU2 per processor core (e.g., core 135) are discussed. However, the below-discussed computations can also be applied to a processor core with more than two hardware threads.

The two hardware threads CPU1 and CPU2 share an interval time counter (ITC) 140, and the ITC 140 value advances at a constant rate irrespective of which hardware thread CPU1 or CPU2 executes on the processor 130. Alternatively, each hardware thread is associated with its own ITC. As known to those skilled in the art, an ITC provides a time interval for counting the processor cycles (CPU execution time) that are consumed by a hardware thread. The number of occurring processor cycles is counted between a start time and a stop time in the ITC. As known to those skilled in the art, state transition values in the kernel layer 115 indicate if an application 110 is executing in the user space 105 or kernel space 115 or is idle. The ITC 140 sets the time interval for measuring application execution time in the user space and kernel space and when the application is not executing (i.e., idle).

Also, the architecture of the multithreaded processor core 135 supports a yield instruction 142 that permits one of the hardware threads (e.g., CPU2) to yield processing cycles to a sibling hardware thread (e.g., CPU1) in the core 135. Yield instructions for performing yield operations (e.g., PAL_HALT_LIGHT or hint@pause) are known to those skilled in the art. An example PAL_HALT_LIGHT function places a hardware thread in a halt state. Another example yield function is the hint@pause instructions which trigger a hardware thread to yield execution to another hardware thread of the core. The use of the yield operations to place a hardware thread in idle is disclosed in, for example, commonly-assigned U.S. patent application Ser. No. 11/591,140 (U.S. Patent Publication 2008/0114973), by Scott J. Norton, et al., entitled "DYNAMIC HARDWARE MULTITHREADING AND PARTITIONED HARDWARE MULTITHREADING", which is hereby fully incorporated herein by reference.

In current operating systems (e.g., HP-UX from HEWLETT-PACKARD COMPANY), consumed processor cycles are typically charged (allocated) to three basic processor cycles states as shown in the tables below: user cycles, system cycles, and idle cycles. The user cycles represent the processor cycles when a hardware thread CPU1 or CPU2 is executing instructions of the application 110. The system cycles represent the processor cycles when the hardware thread is running the application 110, and the application is sending a system call 155 to the operating system kernel layer 115. For example, the system call 155 is an input/output (I/O) request to a file 156 in the kernel layer 115. Idle cycles represent the processor cycles when a hardware thread is not running an application 110 and the hardware thread is spinning in a loop. The idle cycles represents wasted processor cycles that reduces utilization.

For the scenarios in the example tables below, assume that a total of 20,000 processor cycles per core 135 is allocated, and each hardware thread (CPU1 and CPU2) in the core 135 is allocated 10,000 cycles. Therefore, CPU1 and CPU2 will equally share the processor resources 136. As mentioned above, the processor cycles are measured in a time interval that is set by the ITC 140.

The example of Table 1 accounts for 100% of total cycles available, and both the processor core 135 and logical processors CPU1 and CPU2 are fully (or 100%) utilized, and the zero idle cycles in this optimal scenario provides the highest possible throughput. The processor cycles are split between the user cycles and system cycles.

TABLE 1

| | Hardware thread: | |
|---|---|---|
| | CPU1 | CPU2 |
| user cycles: | 5000 | 5000 |
| system cycles: | 5000 | 5000 |
| idle cycles: | 0 | 0 |
| total cycles: | 10,000 | 10,000 |

The next example in Table 2 shows how much processor cycles are consumed in each cycles state when a yield operation is applied so that the CPU2 yields its idle cycles to CPU1 (i.e. 2500 idle cycles were yielded to the user cycles of CPU1).

TABLE 2

| | Hardware thread: | |
|---|---|---|
| | CPU1 | CPU2 |
| user cycles: | 7500 | 2500 |
| system cycles: | 5000 | 5000 |
| idle cycles: | 0 | ~0 (idle = 2500 cycles, but were yielded to CPU1's user cycles) |
| total cycles: | 12500 | 7500 |

These measurements in Table 2 represent 100% processor core utilization, as shown by the total cycles of 20,000. The hardware thread CPU1 will have a logical processor utilization of 100% because of the zero value for idle cycles. Table 2 shows a logical processor utilization of 100% for the hardware thread CPU2 because of the idle cycles of 2500 for CPU2 were yielded to CPU1, and this 2500 idle cycles were not consumed by CPU2. Therefore, CPU2 had consumed approximately 0 processor cycles in an idle state. In other words, CPU2 performed a yield operation and yielded the 2500 cycles to CPU1. However, this 100% value for the CPU2 logical processor utilization is not accurate measurement because CPU2 had actually spent a certain amount of time in the idle state while consuming approximately zero idle cycles.

The next example in Table 3 shows how much time is spent in the idle state by CPU2, when CPU2 performs a yield operation under the similar condition above in Table 2. Although CPU2 yielded 2500 idle cycles to CPU1, CPU2 still spent 2500 cycles time in the idle state (see Table 3) while consuming approximately zero cycles in the idle state (as in Table 2). Therefore, the time that is spent in the idle state is analogous to actual an "wall clock" time that a hardware thread had spent in idle.

TABLE 3

| | Hardware thread: | |
| --- | --- | --- |
| | CPU1 | CPU2 |
| user cycles: | 7500 | 2500 |
| system cycles: | 5000 | 5000 |
| idle cycles: | 0 | 2500 |
| total cycles: | 12500 | 10000 |

Table 3 shows a 112.5% value of the total cycles available (i.e., 112.5%=(22500 total cycles)/(20000 allocated core cycles)), which indicates increased throughput for the core 135. Since the 22500 total cycles value is greater than the total allocated cycles value of 20000, the processor core utilization is also at the 100% value. The hardware thread CPU1 is at 100% logical processor utilization (since the user and system cycles of 12500 cycles is greater than the allocated 10000 cycles per hardware thread. However, CPU2 is at a 75% value in logical processor utilization (i.e., 75%=(7500 user & system cycles)/(10000 allocated logical processor cycles)), since the 2500 idle cycles are time spent by CPU2 in idle.

An embodiment of the invention provides a method for determining the processor core utilization for a core 135 and logical processor utilization for threads (e.g., CPU1 and CPU2) by calculating the time (cycles) spent in idle by a hardware thread versus the time (cycles) actually consumed in idle by the hardware thread. This calculation can be applied to each hardware thread in a core 135. In FIG. 1, the ITC 140 provides the time intervals in which processor cycles for the hardware threads CPU1 and CPU2 are measured, and a utilization measurement engine 160 will measure the counter values $d1$ and $d2$ in cycles, and calculate the counter value $d3$ in cycles, as discussed below. Alternatively, the engine 160 will directly measure the $d3$ value.

The idle time spent cycles ($d1$) is the time amount that a hardware thread spent in a code path for the idle state. The example yield operations that are performed by a hardware thread to go into the idle state were described above. The $d1$ value can be calculated (or measured) by $d1=t2-t1$, where $t1$ and $t2$ are the time stamps when the hardware thread enters and exits, respectively, the code path for the idle state.

The idle cycles yielded ($d2$) is the time amount that a hardware thread yields to a sibling hardware thread in the core 135. The $d2$ value can be calculated (measured) by $d2=t2'-t1'$, where $t1'-t2'$ is the time interval of the yield operation that gives processor cycles from one hardware thread (e.g., CPU2) to a sibling hardware thread (e.g., CPU1).

The idled consumed cycles ($d3$) is the actual processor cycles that are consumed from the idle time spent cycles ($d1$), by the hardware thread. The $d3$ value can be calculated by $d3=d1-d2$ (i.e., the difference between the idle time spent cycles by the hardware thread and the idle cycles yielded to the sibling hardware thread). The $d3$ value will typically include the actual processor cycles that are consumed by a hardware thread when the hardware thread is performing hardware context switching and/or is in idle prior to yielding the processor cycles to its sibling hardware thread, and/or other processor cycles that are not yielded to the sibling hardware thread from the idle time spent cycle ($d1$) of the hardware thread. In another embodiment of the invention, the coding in the engine 160 may alternatively be written to directly measure $d3$.

For each hardware thread CPU1 and CPU2, the utilization measurement engine 160 tracks a running total of "idle_consumed_cycles" ($d3=d1-d2$) and "idle_time_spent_cycles" ($d1$). These values are then used to provide an accurate measurement of processor core utilization and logical processor core utilization in the hardware multithreaded processor core 135. Various utilization measurements or conditions are discussed below with reference to FIG. 2.

Time accounting on hardware multithreading when yield operations are performed by hardware threads are discussed in, for example, commonly-assigned U.S. patent application Ser. No. 11/554,566, which is hereby fully incorporated herein by reference. The counting of processor cycles that are charged to application software tasks is disclosed in, for example, commonly-assigned U.S. patent application Ser. No. 11/796,511 (U.S. Patent Publication 2008/0271027), concurrently filed herewith, by Scott J. Norton and Hyun Kim, entitled, "FAIR SHARE SCHEDULING WITH HARDWARE MULTITHREADING", which is hereby fully incorporated herein by reference.

Figure 2:
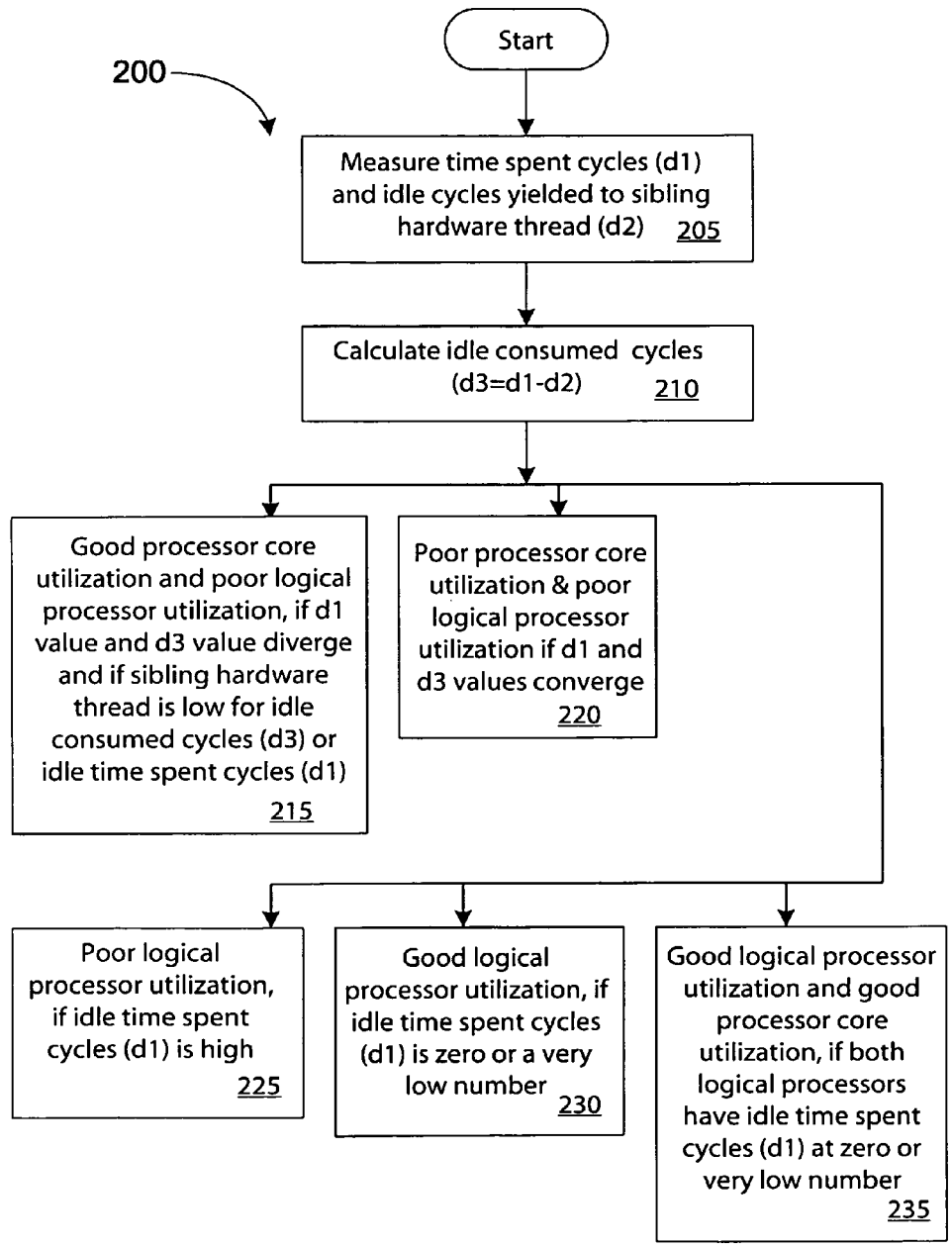
FIG. 2 is a flow diagram of a method in accordance with another embodiment of the invention.

Reference is now made to FIG. 1 and FIG. 2 to describe an operation of an embodiment of the invention.

In block 205 (FIG. 2), the engine 160 (FIG. 1) measures the idle time spent cycles ($d1$) which is the time that a hardware thread spends in idle, and idle cycles yielded ($d2$) which are the cycles that the hardware thread had yielded to a sibling hardware thread in the processor core.

In block 210, the idle consumed cycles ($d3$) for a hardware thread is calculated by the difference of idle time spent cycles ($d1$), and idle cycles yielded ($d2$). The values $d1$, $d2$, and $d3$ are calculated or measured for both hardware threads CPU1 and CPU2 of core 135. The $d3$ value is the cycles consumed by a hardware thread in the idle time spent cycles ($d1$) of the hardware thread. The consumed cycles permits execution of an application software thread. As also mentioned above, the engine 160 typically maintains a running total of $d1$ and $d3$ as the processor core 135 performs operations.

Blocks 215-235 illustrate possible conditions or measurements for the processor core utilization and/or logical processor utilization, by use of $d1$ and/or $d3$, as discussed below. These conditions provide utilization information that can be beneficially used in capacity planning and load distribution algorithms, so that known adjustment techniques can be made by those skilled in the art to improve hardware computing performance or throughput.

In block 215, the core 135 will have a second processor core utilization condition (i.e., good processor core utilization) (e.g., approximately 100% or other high percentage value) and a hardware thread (e.g., CPU2) will have a first logical processor utilization condition (i.e., poor logical processor utilization) (e.g., less than approximately 75% or other percentage value), if the $d1$ and $d3$ ($d1$-$d2$) values diverge and if the sibling hardware thread (e.g., CPU1) is low for idle consumed cycles ($d3$) or is low for idle time spent cycles ($d1$). If $d1$ and $d3$ are diverging for a particular sibling thread (e.g., CPU2), then the idle time spent cycles ($d1$) for CPU2 was large in value (indicating that CPU2 was idle for a longer time period) and the idle consumed cycles ($d3$) for CPU2 is lower in value because of the $d1$ and $d3$ divergence value. The lower value in $d3$ indicates that CPU2 is yielding processor cycles to CPU1 because CPU2 is consuming the lower value of $d3$ cycles, and therefore, the logical processor utilization for CPU2 is poor because CPU2 is not consuming the processor cycles (or is consuming a lower amount of cycles) from the idle time spent cycles ($d1$). Since the other sibling hardware thread CPU1 has a low value for idle consumed cycles ($d3$) and low value for idle time spent cycles ($d1$), CPU1 is not spending significant time (or any time) in idle and is not consuming processing cycles from its $d1$ cycles. The processor cycles that were given by CPU2 during idle to CPU2 is used, for example, in the user cycles state (see Table 2 or Table 3) of CPU1. Therefore, since CPU1 was able to use the processing cycles that was given by CPU2, there is good processor core utilization for core 135. Note that user can choose any suitable threshold value for the d1 and d3 threshold divergence value such as, for example, 2000 cycles or other cycle values that depends on the target or required utilization (e.g., 80%) for the hardware threads and/or processor core in a hardware implementation. Also, the threshold values for good processor core utilization (i.e., second processor core utilization condition), poor processor core utilization (i.e., first processor core utilization condition), good logical processor utilization (i.e., second logical processor utilization condition), and poor logical processor utilization (i.e., first logical processor utilization condition) may be target values that the user can choose, depending on the target or required utilization for the hardware threads and/or processor core in a hardware implementation. Block 215 shows the step of determining core utilization and logical processor utilization based on the d1 and d3 values.

In block 220, the core 135 will have poor processor core utilization (i.e., first processor core utilization condition), if the d1 and d3 values converge (i.e., the values are close to one another). For example, assume that there are 20,000 allocated cycles for thread CPU2 and 5000 cycles are spent in idle time spent cycles (d1) and 5000 cycles are spent in idle consumed cycles (d3). This convergence condition indicates the CPU2 spent a significant time in idle and attempted to give its idle cycles to sibling thread CPU1, but since CPU1 is also idle, these idle cycles were returned by CPU1 to CPU2. Therefore, CPU2 was not able to effectively yield the cycles to CPU1. Both CPU1 and CPU2 were spending significant time in idle, and this condition results in poor logical processor utilization for both CPU1 and CPU2 and, therefore, also results in poor processor core utilization (i.e., first processor core utilization condition). Block 220 shows the step of determining core utilization and logical processor utilization based on the convergence of the d1 and d3 values.

In block 225, the core 135 will have poor logical processor utilization (i.e., first logical processor utilization condition), if idle time spent cycles (d1) is high in value (i.e., d1 is a larger percentage of the allocated cycles). In this case, a hardware thread (e.g., CPU2) spent significant time in idle and may have or may have not yielded any of its d1 cycles to the sibling thread CPU1. Since d1 is high, the logical processor utilization for CPU2 is poor. Block 225 shows the step of logical processor utilization based on the d1 value. In block 230, the core 135 will have good logical processor utilization, if idle time spent cycles (d1) is zero or a very low number or very low value (i.e., d1 is a smaller percentage of the allocated cycles). In this case, a hardware thread (e.g., CPU2) spent zero time or very little time in idle. Since d1 is between zero and a low value, inclusive of zero and the low value, the logical processor utilization for CPU2 is good. This condition is opposite to the condition in block 225. Block 230 shows the step of determining logical processor utilization based on the d1 value.

In block 235, the core 135 will have good logical processor utilization and good processor core utilization, if both logical processor CPU1 and CPU2 have idle time spent cycles (d1) at zero or at a very low number or value (i.e., a smaller percentage of the allocated cycles or less). In this case, both hardware threads CPU1 and CPU2 spent between zero time or very little time in idle. Since d1 is between zero or a low value, inclusive of zero or the low value, for both CPU1 and CPU2, the logical processor utilization for CPU1 and CPU2 is good. Good logical processor utilization for CPU1 and CPU2 leads to good processor core utilization, since both CPU1 and CPU2 are spending no time or very little time in idle. Block 235 shows the step of determining core utilization and logical processor utilization based on the d1 value.

Therefore, the method 200 permits accurate measurement of processor core utilization versus logical processor utilization, irrespective of the use of a shared ITC or dedicated per hardware thread ITC on the core 135, and irrespective of whether hardware thread scheduling yield operation is applied to any of the hardware threads in the core 135.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for accurate measurement of utilizations in a hardware multithreaded processor core having a plurality of hardware threads, the method, comprising:

determining idle time spent cycles (d1), for a first hardware thread in the multithreaded processor core, which are cycles that elapse between a first time stamp that indicates a hardware thread enters an idle state and a second time stamp that indicates the hardware tread exits the idle state;

determining idle cycles yielded (d2) for the first hardware thread, which are cycles that the hardware thread has yielded to a sibling hardware thread in the multithreaded processor core;

determining idle consumed cycles (d3), for the first hardware thread, which are cycles that are consumed by the hardware thread from the idle spent cycles (d1) and which are cycles defined by a difference between, the idle spent cycles (d1) for the hardware thread and the idle cycles yielded (d2) for the hardware thread;

determining idle time spent cycles (d1) for a second hardware thread in the multithreaded processor core;

determining idle cycles yielded (d2) for the second hardware thread in the multithreaded processor core;

determining idle consumed cycles (d3), for the second hardware thread in the multithreaded processor core; and determining that a utilization measurement of the multi-threaded processor core is a fully utilized measurement that indicates that the multithreaded processor core is being fully utilized and determining that a utilization measurement of the first hardware thread is a non-utilized measurement that indicates that the first hardware thread is not being fully utilized if the difference between the idle time spent cycles (d1) for the first hardware thread and the idle consumed cycles (d3) for the first hardware thread is greater than a threshold divergence value and if the idle time spent cycles (d1) for the second hardware thread is lower than a first threshold or the idle consumed cycles (d3) for the second hardware thread is lower than a second threshold.

2. The method of claim 1, further comprising:
determining that the utilization measurement of the multithreaded processor core is a first non-utilized measurement that indicates that the multithreaded processor core is not being fully utilized and determining that the utilization measurement of the first hardware thread is a second non-utilized measurement that indicates that the first hardware thread is not being fully utilized if the idle time spent cycles (d1) are the same as the idle consumed cycles (d3).

3. The method of claim 1, further comprising:
determining that the utilization measurement of the first hardware thread is a non-utilized measurement that indicates that the first hardware thread is not being fully utilized if the idle time spent cycles (d1) has a value greater than a predetermined upper threshold value.

4. The method of claim 1, further comprising:
determining that the utilization measurement of the first hardware thread is a fully utilized measurement that indicates that the first hardware thread is being fully utilized if the idle time spent cycles (d1) is below a predetermined lower threshold value.

5. The method of claim 1, further comprising:
determining that the utilization measurement of the multithreaded processor core is a first fully utilized measurement that indicates that the multithreaded processor core is being fully and determining that the utilization measurement of the first hardware thread is a second fully utilized measurement that indicates that the first hardware thread is being fully utilized if the idle time spent cycles (d1) of the first hardware thread is below a predetermined lower threshold value and the idle time spent cycle (d1) of the second hardware thread is below the predetermined lower threshold value.

6. The method of claim 1, wherein the utilization measurement of the multithreaded processor core is associated with an overall utilization of the multithreaded processor core.

7. The method of claim 1, wherein the utilization measurement of the first hardware thread is associated with any hardware thread of the multithreaded processor core.

8. An apparatus for accurate measurement of utilizations in a hardware multithreaded processor core having a plurality of hardware threads, the apparatus comprising:
a hardware multithreaded processor core configured to:
determine idle time spent cycles (d1), a first hardware thread in the multithreaded processor core, which are cycles that elapsed between a first time stamp that indicates that a hardware thread enters an idle state and a second time stamp that indicates that the hardware thread exits the idle state;
determine idle cycles yielded (d2), for the first hardware thread, which are cycles that the hardware thread has yielded to a sibling hardware thread in the multithreaded processor core;
determine idle consumed cycles (d3), for the first hardware thread, which are cycles that are consumed by the hardware thread from the idle spent cycles (d1) and which are cycles defined by a difference between the idle spent cycles (d1) for the hardware thread and the idle cycles yielded (d2) for the hardware thread;
determine idle time spent cycles (d1), for a second hardware thread in the multithreaded processor core;
determine idle cycles yielded (d2), for the second hardware thread in the multithreaded processor core;
determine idle consumed cycles (d3), for the second hardware thread in the multithreaded processor core; and
determine that the utilization measurement of the multithreaded processor core is a fully utilized measurement that indicates that the multithreaded processor core is being fully utilized and determine that the utilization measurement of the first hardware thread is non-utilized measurement that indicates that the first hardware thread is not being fully utilized if the difference between the idle time spent cycles (d1) for the first hardware thread and the idle consumed cycles (d3) for the first hardware thread is greater than a threshold divergence value and if the idle time spent cycles (d1) for the second hardware thread is lower than a first threshold or the idle consumed cycles (d3) for the second hardware thread is lower than a second threshold.

9. The apparatus of claim 8, wherein the hardware multithreaded processor core is configured to determine that the utilization measurement of the multithreaded processor core is a first non-utilized measurement that indicates that the multithreaded processor core is not being fully utilized and determine that the utilization measurement of the first hardware thread is a second non-utilized measurement that indicates that the first hardware thread is not being fully utilized if the idle time spent cycles (d1) are the same as the idle consumed cycles (d3).

10. The apparatus of claim 8, wherein the hardware multithreaded processor core is configured to determine that the utilization measurement of the first hardware thread is a non-utilized measurement that indicates that the first hardware thread is not being fully utilized if d1 has value greater than a predetermined upper threshold value.

11. The apparatus of claim 8, wherein the hardware multithreaded processor core is configured to determine that the utilization measurement is a fully utilized measurement that indicates that the first hardware thread is being fully utilized if the idle time spent cycles (d1) is below a predetermined lower threshold value.

12. The apparatus of claim 8, wherein the hardware multithreaded processor core is configured to;
determine that the utilization measurement of the multithreaded processor is a first fully utilized measurement that indicates that the multithreaded processor core is being fully utilized and determine that the utilization measurement of the first hardware thread is a second fully utilized measurement that indicates that the first hardware thread is being fully utilized if the idle time spent cycles (d1) for the first hardware thread is below a predetermined lower threshold value and the idle time spent cycle (d1) of the second hardware thread is below the predetermined lower threshold value.

13. The apparatus of claim 8, wherein the utilization measurement of the multithreaded processor core is associated with an overall utilization of the multithreaded processor core.

14. The apparatus of claim 8, wherein the utilization measurement of the first hardware thread is associated with any hardware thread of the multithreaded processor core.

15. An apparatus for accurate measurement of utilizations in a hardware multithreaded processor core having a plurality of hardware threads, the apparatus comprising:
- a memory; and
- a processor configured to execute instructions stored on the memory, the instructions comprising instructions for:
- determining idle time spent cycles (d1), for a first hardware thread in the multithreaded processor core, which are cycles that elapse between a first time stamp that indicates that a hardware thread, enters an idle state and a second time stamp that indicates the hardware thread exits the idle state;
- determining idle cycle yielded (d2), for the first hardware thread, which are cycles that the hardware thread has yielded to a sibling hardware thread in the multithreaded processor core;
- determine idle consumed cycles (d3), for the first hardware thread, which are cycles that are consumed by the hardware thread from the idle spent cycles (d1) and which are cycles defined by a difference between the idle spent cycles (d1) for the hardware thread and the idle cycles yielded (d2) for the hardware thread;
- determining idle time spent cycles (d1), for a second hardware thread in the multithreaded processor core;
- determine idle cycles yielded (d2), for the second hardware thread in the multithreaded processor core;
- determine idle consumed cycles (d3), for the second hardware thread in the multithreaded processor core; and
- determine that the utilization measurement of the multithreaded processor core is a fully utilized measurement that indicates that the multithreaded processor core is being fully utilized and determine that the utilization measurement of the first hardware thread is a non-utilized measurement that indicates that the first hardware thread is not being fully utilized if the difference between the idle time spent cycles (d1) for the first hardware thread and the idle consumed cycles (d3) for the first hardware thread is greater than a threshold divergence value and if the idle time spent cycles (d1) for the second hardware thread is lower than a first threshold or the idle consumed cycles (d3) for the second hardware thread is lower than a second threshold.

* * * * *

UNITED STATES PATENT AND TRADEMARK OFFICE
CERTIFICATE OF CORRECTION

PATENT NO.        : 8,739,162 B2
APPLICATION NO.   : 11/796423
DATED             : May 27, 2014
INVENTOR(S)       : Hyun Kim et al.

Page 1 of 1

It is certified that error appears in the above-identified patent and that said Letters Patent is hereby corrected as shown below:

In the Claims

In column 8, line 40, in Claim 1, delete "method," and insert -- method --, therefor.

In column 8, line 54, in Claim 1, delete "between," and insert -- between --, therefor.

In column 9, line 37, in Claim 5, delete "fully" and insert -- fully utilized --, therefor.

In column 9, line 55, in Claim 8, delete "a" and insert -- for a --, therefor.

In column 11, line 10, in Claim 15, delete "thread," and insert -- thread --, therefor.

Signed and Sealed this
Ninth Day of September, 2014

Michelle K. Lee
*Deputy Director of the United States Patent and Trademark Office*